(12) United States Patent
MacDonald

(10) Patent No.: US 7,830,268 B1
(45) Date of Patent: Nov. 9, 2010

(54) HIGH LIQUID ALARM SYSTEM

(75) Inventor: Ronald MacDonald, San Jancinto, CA (US)

(73) Assignee: SEEwater, Inc., San Jacinto, CA (US)

( * ) Notice: Subject to any disclaimer, the term of this patent is extended or adjusted under 35 U.S.C. 154(b) by 0 days.

(21) Appl. No.: 12/371,403

(22) Filed: Feb. 13, 2009

Related U.S. Application Data

(63) Continuation of application No. 11/342,301, filed on Jan. 27, 2006, now Pat. No. 7,492,272.

(60) Provisional application No. 60/647,982, filed on Jan. 27, 2005.

(51) Int. Cl.
*G08B 21/00* (2006.01)
(52) U.S. Cl. .................. 340/612; 340/618; 73/290 R
(58) Field of Classification Search ............... 340/612, 340/618; 73/290
See application file for complete search history.

(56) References Cited

U.S. PATENT DOCUMENTS

| | | | |
|---|---|---|---|
| 4,131,773 A | 12/1978 | Maham et al. | |
| 4,320,394 A | 3/1982 | John, Jr. | |
| 4,586,033 A | 4/1986 | Andrejasich | |
| 4,663,614 A | 5/1987 | Rauchwerger | |
| 4,682,156 A | 7/1987 | Wainwright | |
| 4,728,941 A | 3/1988 | Andrejasich | |
| 4,800,372 A | 1/1989 | Poteet | |
| 4,804,936 A * | 2/1989 | Sale ........................ | 338/80 |
| 4,818,976 A | 4/1989 | Schmitt et al. | |
| 4,827,246 A | 5/1989 | Dolan et al. | |
| 4,989,452 A * | 2/1991 | Toon et al. ................ | 73/293 |
| 5,005,005 A | 4/1991 | Brossia et al. | |
| 5,264,368 A | 11/1993 | Clarke et al. | |

(Continued)

FOREIGN PATENT DOCUMENTS

CA   2292901   6/2001

(Continued)

OTHER PUBLICATIONS

SeeWater Inc. Oil Smart Alarm System Installation Instructions in 2 pages.

(Continued)

*Primary Examiner*—George A Bugg
*Assistant Examiner*—Kerri McNally
(74) *Attorney, Agent, or Firm*—Knobbe, Martens, Olson & Bear LLP

(57) ABSTRACT

A high liquid alarm system for use in detecting the presence of water and oil in water present in a confined space is disclosed. In one implementation, the system includes an optical sensor capable of detecting water at a certain level, a sensing device capable of differentiating oil and water, and an alarm indicator. The sensors are in communication with an indicator which is capable of providing alert signals. The optical sensor is configured to activate a second alarm in the indicator when water is detected at about a predetermined level and the sensing device is configured to trigger a first alarm when oil in water is detected at about the predetermined level. The sensors can also be interconnected such that the sensing device is activated upon detection of water by the optical sensor, reducing the power consumption of the system.

13 Claims, 7 Drawing Sheets

U.S. PATENT DOCUMENTS

| | | |
|---|---|---|
| 5,287,086 A | 2/1994 | Gibb |
| 5,305,779 A | 4/1994 | Izaguirre |
| 5,463,378 A | 10/1995 | Gibb |
| 5,507,178 A | 4/1996 | Dam |
| 5,550,532 A | 8/1996 | Marshall |
| 5,628,350 A | 5/1997 | Gibb |
| 5,802,910 A * | 9/1998 | Krahn et al. ............ 73/299 |
| 5,856,783 A | 1/1999 | Gibb |
| 6,203,281 B1 | 3/2001 | Gurega |
| 6,414,598 B2 | 7/2002 | Freill et al. |
| 6,476,723 B1 | 11/2002 | Campbell et al. |
| 6,885,306 B2 | 4/2005 | Holzman et al. |
| 7,199,388 B2 | 4/2007 | Omatoi |
| 2004/0036618 A1 | 2/2004 | Ku et al. |

FOREIGN PATENT DOCUMENTS

JP    55151240 A2    11/1980

OTHER PUBLICATIONS

Gemssensors Catalogue, p. A-25.
Product Specification of Weil S100K7126 Oil Sensor, p. 8100.

* cited by examiner

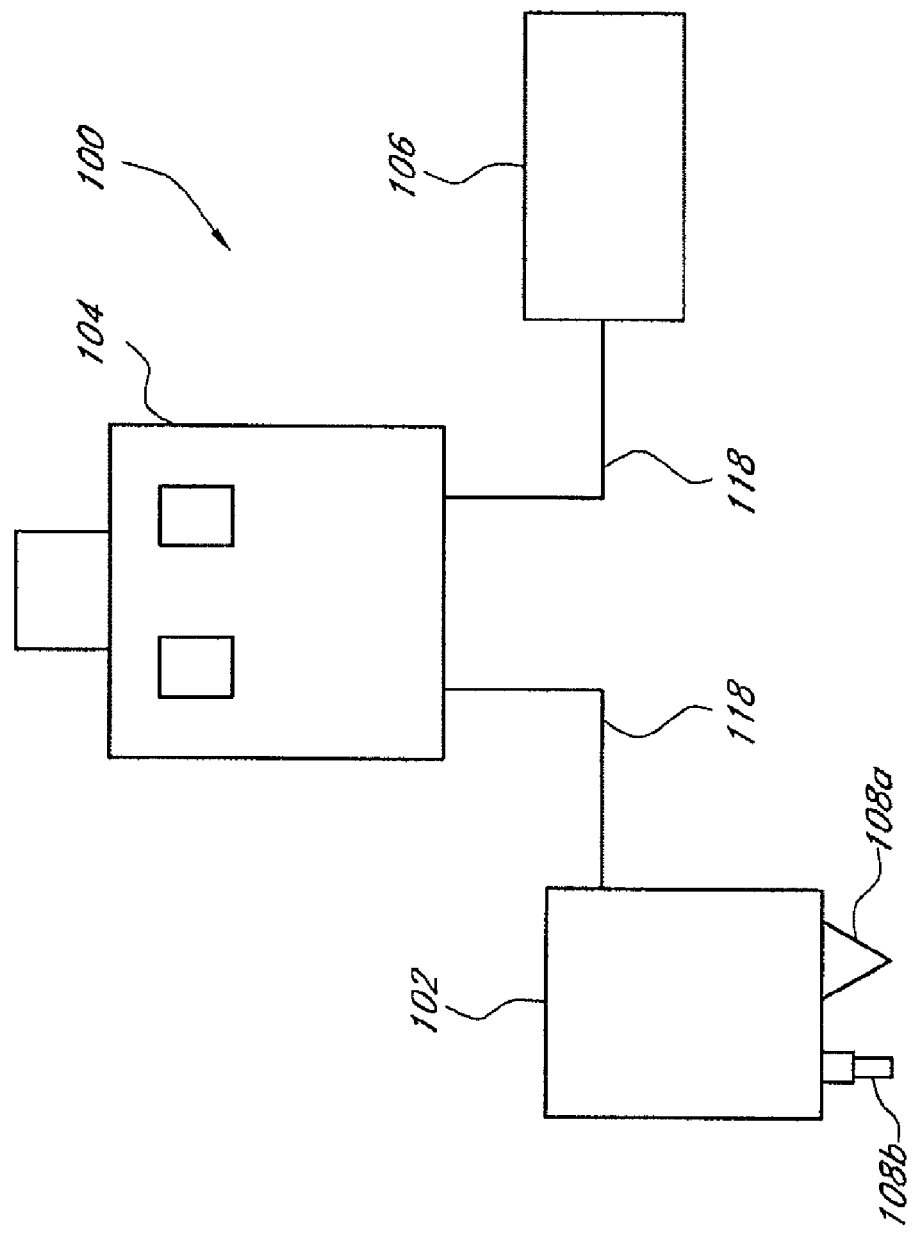

HIGH LIQUID ALARM SYSTEM

CLAIM FOR PRIORITY

This application is a continuation of U.S. application Ser. No. 11/342,301 (now U.S. Pat. No. 7,492,272), filed on Jan. 27, 2006 and entitled HIGH LIQUID ALARM SYSTEM, which claims the benefit of priority under 35 U.S.C. §119(e) of U.S. Provisional Application No. 60/647,982, filed on Jan. 27, 2005 and entitled HIGH LIQUID ALARM SYSTEM, the entirety of each of which is incorporated herein by reference.

BACKGROUND OF THE INVENTION

1. Field of the Invention

The present invention relates generally to alarm systems used in signaling the presence of oil and/or water in a confined area and, in particular, concerns such an alarm system that can be used in conjunction with submersible pumps in areas such as transformer vaults and elevator shafts to detect pump malfunctions and substantially prevent oil leaks from being pumped with water into the environment.

2. Description of the Related Art

Important technological infrastructure, such as electrical hardware and elevator hydraulics and cables, are often located in enclosed spaces such as transformer vaults and elevator shafts. This infrastructure is enclosed for a variety of reasons, including engineering design, prevention of injury or theft, noise dampening, and aesthetics. However, these enclosed spaces are often subject to waste water accumulation as water from rain, irrigation, leaks, and other sources may enter these spaces, accumulate, and flood the enclosure.

To prevent water from rising above a certain level in these enclosed spaces, submersible pumps are often used to remove accumulated water from these locations. The water is typically pumped into a reservoir and ultimately released into the environment via a sewer system or the like. However, when submersible pumps malfunction, the accumulated waste water can reach an unacceptable level thereby flooding the enclosed space and damaging the equipment therein. Additionally, the waste water is often mixed with oil that leaked from the equipment in these structures. This oil-water mixture presents an environmental hazard if it is pumped into the sewer system.

One solution which has been developed for this problem is the use of a mechanical float switch interconnected to an oil sensor and a pump. As the water level in the enclosed space changes, the float switch moves up and down on the surface of water. The resulting tilting movement is sensed by an internal switch within the float and triggers the pump to activate. If the oil sensor detects oil, the pump is not allowed to activate, while if oil is not detected, the pump is allowed to activate.

However, these float switches could be problematic as a level sensing device. Float switches are relatively imprecise, as they do not trigger at a set level but rather trigger based on a tilting motion. As a result, there is a relatively wide water level range over which the float may trigger. This range is further widened should the water be turbulent. Furthermore, the mechanical trigger within the float may fail over time due to wear or fatigue.

In view of the foregoing, there is need for an improved alarm system which detects the presence of water so as to provide an alert that water has accumulated beyond a predetermined location. Further, there is need for an alarm system which is capable of differentiating between water and oil.

SUMMARY OF THE INVENTION

In one aspect, the preferred embodiments of the present invention provide an alarm system for detecting the presence of conductive and non-conductive liquids in a confined area. The alarm system comprises an optical sensor capable of detecting the presence of liquid at a predetermined level in the confined area, a sensing device capable of differentiating between conductive and non-conductive liquids which is operatively coupled to the optical sensor and activated when the optical sensor detects the presence of liquid at the predetermined level in the confined area, and an indicator which provides a signal when the activated sensing device senses the presence of a non-conductive liquid. In one embodiment of the alarm system, the sensing device comprises a capacitance based dielectric sensing device. In another embodiment, the sensing device is positioned at a level that is above the predetermined level. In a further embodiment, the sensing device is deactivated when the optical sensor no longer detects the presence of liquid at the predetermined level in the confined area. In another embodiment, the alarm system further comprises a second indicator which provides a signal when the activated sensing device does not sense the presence of a non-conductive liquid. In an additional embodiment, the non-conductive liquid comprises oil. In a further embodiment, the optical sensor and sensing device are packaged in a compact enclosure. In another embodiment, the signal provided by the indicator is selected from the group consisting of audible signals, visible signals, infrared signals, and combinations of these signals. In an additional embodiment, the indicator is located external to the confined area.

In another aspect, the preferred embodiments of the present invention provide a method of providing an alarm when oil or water is present in a confined area. The method comprises transmitting light across a predetermined space in the confined area, determining whether liquid is present in the predetermined space based on the amount of light transmitted through the space, energizing a device that is capable of differentiating between water and oil when liquid is present in the space, and transmitting a signal to activate an alarm if the presence of oil is detected in the liquid. In one embodiment of the method, the method further comprises transmitting a signal to activate a first alarm when liquid is present in the predetermined space and oil is not present in the liquid. In another embodiment, the confined area is an electrical vault. In a further embodiment, detection of the presence of oil is accomplished using a capacitance sensing circuit. In an additional embodiment, the sensing device is deactivated when liquid is no longer present in the predetermined space.

In yet another aspect, the preferred embodiments of the present invention provide an alarm system for detecting the presence of conductive and non-conductive liquid in a confined area. The alarm system comprises a sensing means for optically sensing the presence of liquid at a predetermined level in the confined area, a detecting means for detecting the presence of oil in the liquid at or above the predetermined level, where the detecting means is activated when the liquid is present at the predetermined level and de-activated when liquid is not present at the predetermined level, and an alarm means for providing an alarm when the detecting means detects the presence of oil in the liquid at or above the predetermined level.

BRIEF DESCRIPTION OF THE DRAWINGS

FIG. 1 is a schematic illustration of a high liquid alarm system of one preferred embodiment;

DETAILED DESCRIPTION OF THE PREFERRED EMBODIMENT

Figure 2A:
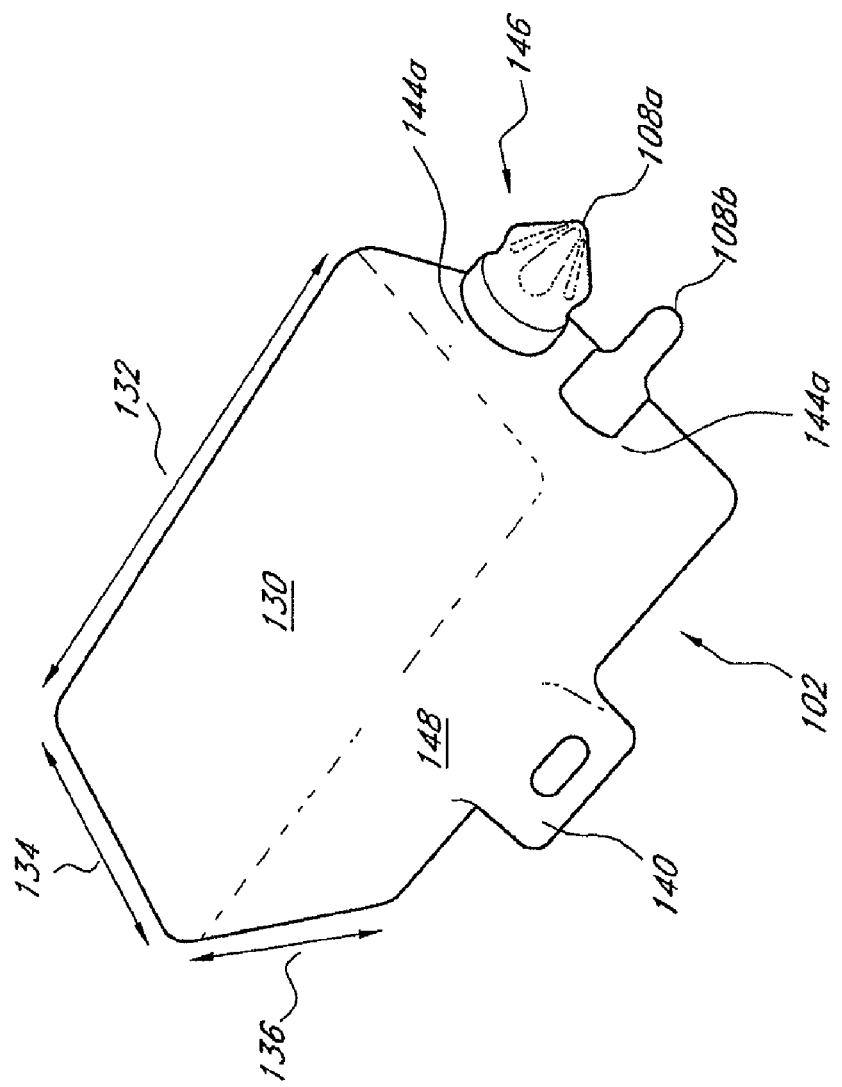
FIGS. 2A-B are schematic illustrations of the sensor device of FIG. 1.

Embodiments of the invention disclosed below relate to an alarm system that can be used in conjunction with submersible water pumps and pump controllers in confined areas to detect the presence of water and oil at a predetermined level, signal an alarm when oil is detected and/or when water reaches an unacceptably high level that is indicative of pump malfunction. Preferred embodiments of the invention may generally be utilized in enclosed and non-enclosed spaces to detect, differentiate, and signal an alarm when any of a plurality different fluids are present at a predetermined level. Furthermore, embodiments of the disclosed invention may be utilized in a wide range of applications, including, but not limited to, industrial dewatering, sump pump controllers, circuit control panels, leak detection, conductive and non-conductive fluid levels, hydrocarbon and vegetable base fluid reservoirs, medical laboratories, food and beverage systems, pharmaceuticals, petrochemicals, and machine tools.

FIG. 1 schematically illustrates a high liquid alarm system 100 of one preferred embodiment, suitable for detecting high water levels as well as the presence of oil in water inside enclosed spaces, such as an elevator shaft or utility vault. The alarm system 100 generally comprises a sensor device 102, an alarm indicator 104 that is electrically coupled to the sensor device 102, and a power source 106 that provides power to the alarm system. In one preferred embodiment, the sensor device 102 includes an optical sensor 108a for the detection of water at a predetermined level in a confined space and a sensing device 108b capable of differentiating between conductive and non-conductive liquid such that it can be used for the detection of oil or other hydrocarbons. Preferably, the sensing device 108b is activated or energized after the optical sensor 108a detects the presence of a liquid at the predetermined level. The alarm indicator 104 provides a signal when the optical sensor and sensing device senses the presence and/or absence of a conductive and non-conductive fluids. Advantageously, as discussed in greater detail below, this design substantially reduces the number of false alarms generated by the sensing device and reduces the power consumption of the system.

As illustrated in the embodiment of FIG. 1, the sensor device 102, the alarm indicator 104 and the power source 106 are operatively coupled through a plurality of electrical conduits 112. The electrical conduits 112 allow electrical communication between the components 102, 104, and 106 in a manner known in the art. This may include, but is not limited to, electrical power and detection status between the sensor device 102 and the alarm indicator 104. In this manner, the indicator 104 provides a signal to communicate detection of the presence or absence of conductive and non-conductive fluids at a predetermined level.

Figure 2B:
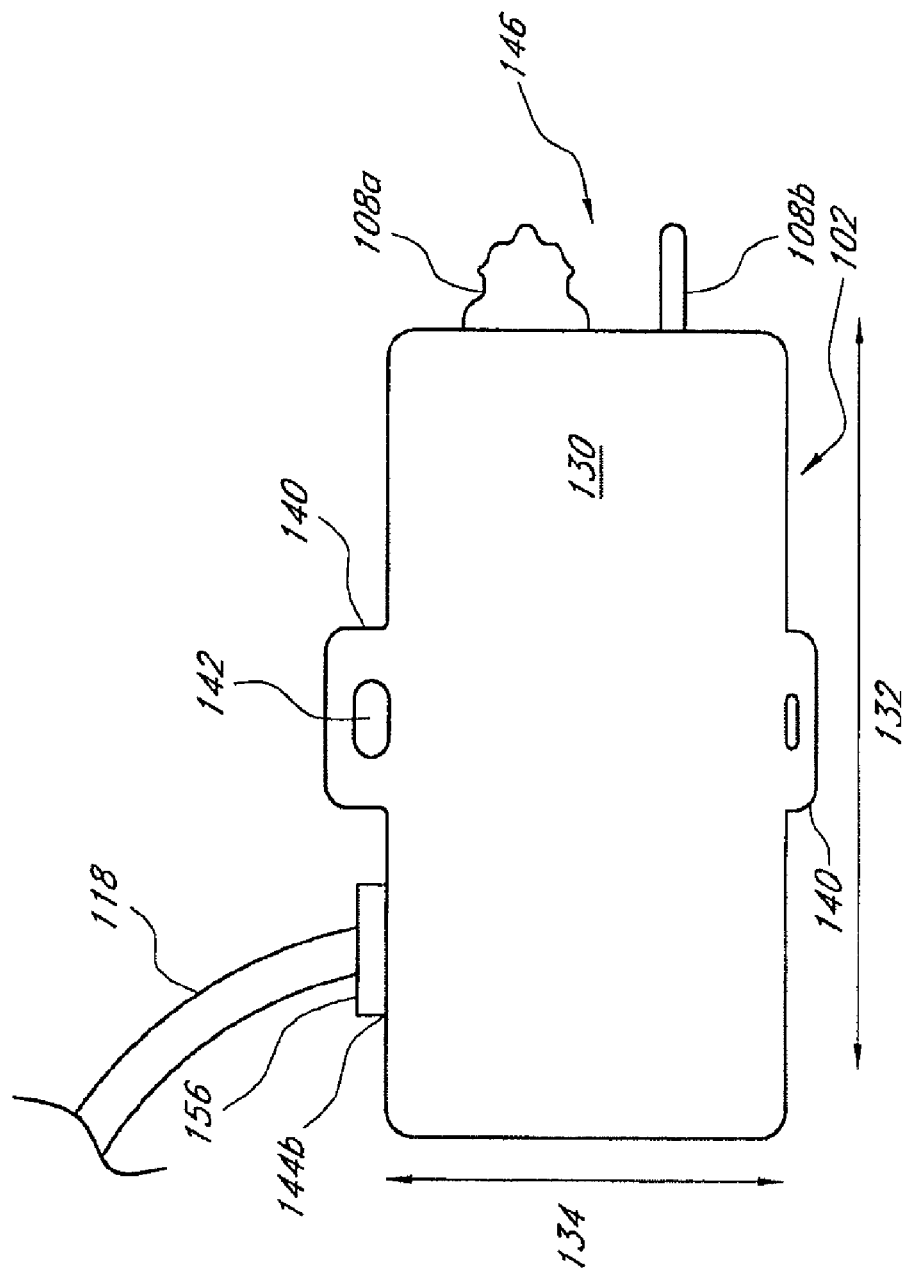

FIGS. 2A-2B illustrate perspective and top down views of one preferred embodiment of the sensor device 102 for the detection of water and oil. As discussed above, the sensor device 102 comprises an optical sensor 108a capable of detecting the presence of liquid, a sensing device 108b capable of differentiating between conducting and non-conducting fluids, such as water and oil or hydrocarbons, and a housing 130 in which the optical sensor 108a and the sensing device 108b are both mounted. In a non-limiting example, as will be discussed in greater detail with respect to FIG. 6, the sensor may be installed at a predetermined level inside an enclosed space, such as above the normal operating range of a water pump. In one embodiment, discussed in greater detail with respect below to FIGS. 3 and 5, the optical sensor 108a is configured to trigger a second alarm when water is detected at about the predetermined level and the sensing device 104 is configured to trigger a first alarm when oil is detected floating on top of the water at about the predetermined level.

In one embodiment, both sensors 108 and 110 may be mounted in an encapsulated housing 130. The housing 130, as illustrated in the embodiments shown in FIGS. 2A-2B, is generally rectangular and hollow, preferably configured so as to contain at least a portion of the sensors 108 and 110 and such control electronics as are necessary to perform the functions of the system 100. In certain embodiments, the container 130 possesses a length 132 of approximately 3", a width 134 of approximately 1.5", and a depth 136 of approximately 1.5". In alternative embodiments, other container 130 shapes are also contemplated, such as square and ovoid.

As also shown in FIGS. 2A-B, a plurality of flanges 140 are further interconnected to the container 130 for mounting the container 130 at a predetermined location. The plurality of flanges 140 extend outward from the container 130, approximately parallel to the container width 134. A flange hole 142, integrally formed within the flange 140, is used with a mounting device (not shown) which may comprise, but is not limited to, screws, nails, or straps for securing the container 130 in place.

In one embodiment, a first plurality of apertures 144a and a second plurality of apertures 144b are formed in the sidewalls 148 of the container 130, allowing access to the container 130 interior. The first plurality of apertures 144a allow at least a portion of the sensors 108 and 110 to emerge from a first end 146 of the container 130. In one embodiment, upon emerging from the container, the sensors 108 and 110 terminate at approximately the same distance from the first end 146 of the container. In another embodiment, the sensing device 108b terminates at least 1/16" above the termination point of the optical sensor 108a so that the sensing device 108b is positioned to detect very thin layers of oil that might float on top of the water. In one embodiment, the second plurality of apertures 144b allow an at least electrical conduit 112 containing electrical wires access to the interior of the container 130 so as to allow electrical communication between the sensor device 102 and the alarm indicator 120, as discussed in greater detail below with respect to FIG. 5. This electrical communication may include, but is not limited to, electrical power and alarm signals.

In a further embodiment, the housing 130 is preferably designed so as to be substantially corrosion resistant, substantially electrically non-conductive, and substantially liquid-tight. Preferably, a plurality of rubber grommets 156, rubber washers, or other sealing devices generally understood by those knowledgeable in the art are used at the apertures 144a and 144b to provide a substantially liquid-tight seal between the housing 130 and sensors 102 and 104 and the electrical conduit 112. In this manner, the design of the housing 130 permits the alarm system to be completely submerged in liquid without substantially experiencing damage.

In certain embodiments of the optical sensor and sensing device and may be interconnected through a single, solid-state electrical circuit within an encapsulated housing in a manner known in the art. Advantageously, enclosing the optical sensor and sensing device and within a single housing 130 provides for a single, compact alarm system 100 for the detection of water and oil, rather than two separate devices. This space savings allows the alarm system to be deployed in enclosed areas with very limited space, which may have be difficult or infeasible with two, non-integrated alarm devices.

Figure 3B:
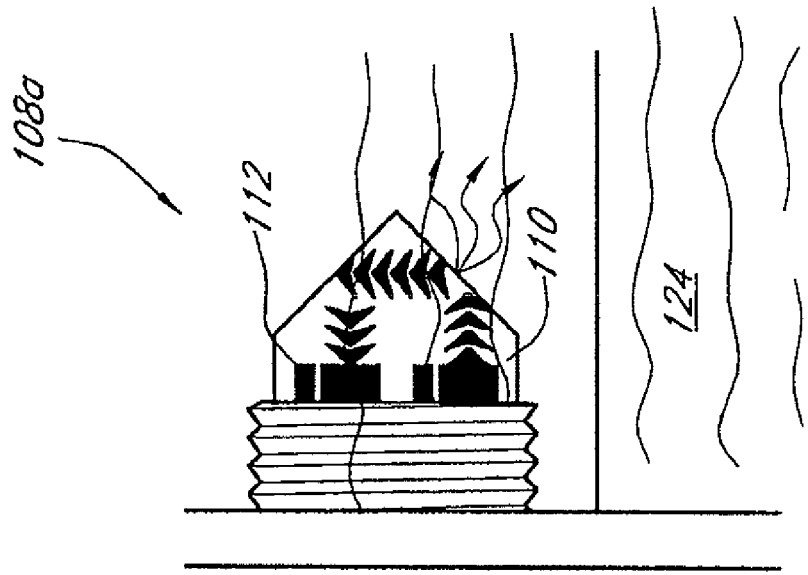
FIGS. 3A-3B are schematic illustrations of the operation of the optical sensor of the alarm system of FIG. 1.
Figure 3A:
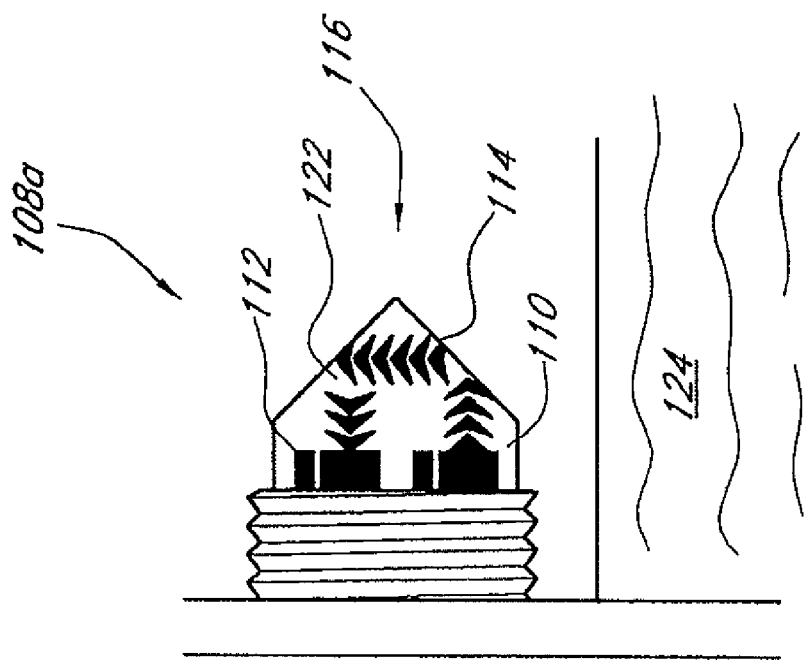

In one embodiment, the water level is detected by the optical sensor 108a. In general, the optical sensor transmits light through a fluid to detect the presence of a liquid. In a preferred embodiment, the optical sensor comprises an ELS-1100 series solid state electro-optic sensor. As illustrated in the embodiment of FIGS. 3A-B, the optical sensor 108a is generally elongate, comprising an LED 110, a light receiver 112, a prism 114 at a optical sensor first end 116. The prism 114 is generally conical and hollow, allowing encapsulation of the LED 110 and light receiver 112 within the prism.

FIGS. 3A-3B further illustrate one embodiment of the operation of the optical sensor 108a. In general, light 122 emerges from the LED 110, is reflected within the prism 114 and accepted by the light receiver 112. Solid state electronics within the optical sensor 108a measure the amount of light 122 entering the light receiver 112 and compares this amount of light 122 to a predetermined reference level. The optical sensor 108a is configured such that when a liquid 124, such as water, is substantially out of contact with the prism 114, the intensity of the light 122 entering the light receiver 112 is above the reference level and the second alarm is not triggered. The optical sensor 108a is further configured such that when the liquid 124 is substantially in contact with the prism 114 as illustrated in FIG. 2B, at least a portion of the light of the LED 110 is refracted out of the prism 114. This refraction attenuates the amount of light 122 entering the light receiver 112 below the reference level. In this case, an electronic switch within the optical sensor 108a is activated, triggering the second alarm to indicate the presence of liquid at approximately the predetermined level of the optical sensor 102. In one embodiment, the second alarm may be received by the alarm indicator 104 in order to signal the second alarm, as discussed in greater detail below with respect to FIG. 4.

Advantageously, in one embodiment, the use of ELS-1100 series devices as the optical sensor provides a number of performance benefits. In one advantage, the use of solid state detecting and switching technology eliminates moving parts from the optical sensor, enhancing the durability to the system. In another advantage, ELS-1100 series devices may be tailored to specific environments which demand high performance such as resistance to chemical attack, high purity, high temperature capability, or high pressure capability.

A further significant advantage of the ELS-1100 series sensor is the high-resolution level sensing provided by the sensor. The ELS-1100 series sensor is capable of repeatedly detecting a liquid level within approximately ±1 mm. As will be described in greater detail below with respect to sensing device, this high-resolution level sensing capability helps to reduce the number of false oil alarms triggered by the system.

However, it will be appreciated that the optical sensor is not limited to the ELS-1100 series sensors as a wide variety of other types of optical sensors are also within the scope of the invention.

In certain preferred embodiments, the sensing device 108b preferably comprise a capacitance-based sensor. In a preferred embodiment, the sensing device 104 is described in further detail in U.S. Pat. No. 5,856,783 entitled "Pump Control System" and is hereby incorporated by reference in its entirety. In brief, this capacitance-based sensor differentiates between oil and water through a pair of capacitive sensors, one located above the other. A dual mode frequency oscillator is associated with each sensor such that each sensor reacts to the dielectric constant of the liquid by changing its capacitance. In this manner, the presence of a conductive substance, such as water, or a non-conductive substance, such as oil, is detected and differentiated. When oil is detected, the sensing device 104 triggers the first alarm in the alarm indicator as discussed in greater detail below with respect to FIG. 5.

Figure 4:
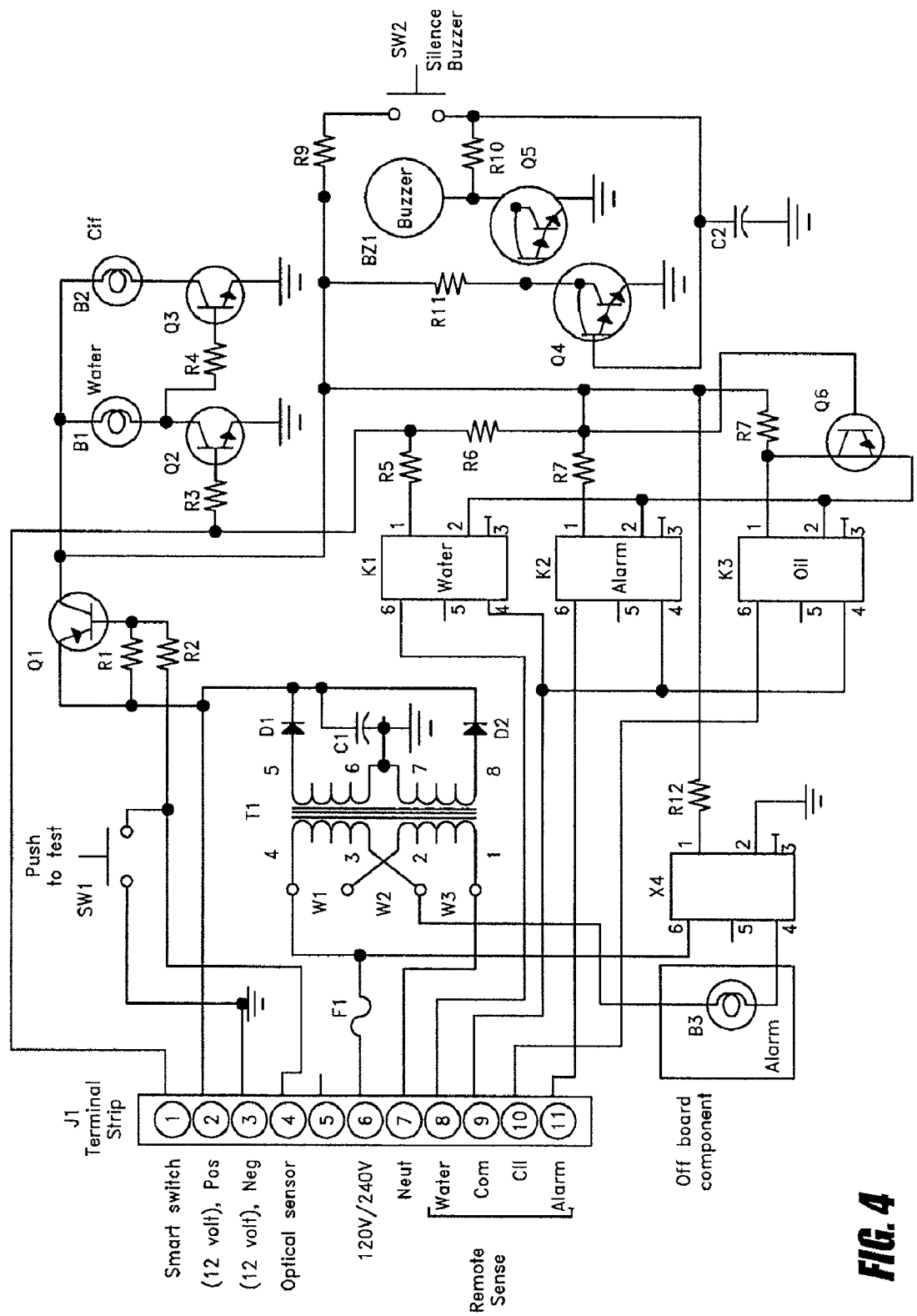
FIG. 4 illustrates a wiring diagram of one preferred embodiment of the alarm system of FIG. 1.

In certain embodiments, the optical sensor 108a and sensing device 108b may be interconnected such that the sensing device 108b is energized only when the optical sensor 108a detects the presence of a liquid. When the optical sensor 108a and sensing device 108b are surrounded by air, the optical sensor 108a is energized while the sensing device 108b is inactive. In the event that a liquid such as water is detected by the optical sensor 108a, the second alarm is triggered and, the optical sensor 108a activates the electric circuit of the sensing device 108b. If oil is present, the oil will normally rise to the top of the water and likely come into with the sensing device 108b. The activated sensing device 108b will then detect the presence or absence of oil and trigger the first alarm if oil is present. FIG. 4 illustrates a circuit diagram of the high water alarm system one preferred embodiments which is designed for the alarm system to perform one or more of the functions described herein.

Advantageously, the high liquid alarm system of a preferred embodiment increases the likelihood that any oil alarm triggered is true. In some embodiments, the sensing device is relatively accurate at differentiating between water and oil, as water is conductive and oil is non-conductive but is less accurate at differentiating between air and oil, as both are non-conductive. Thus, when the optical sensor activates the sensing device, water is likely to be present. As such, the likelihood of mis-detecting the presence of air as oil is low. Furthermore, as the optical sensor of one embodiment of the system comprises a high-resolution optical level sensor, the range of water levels over which the sensing device is activated is small. This limited activation range of the sensing device further diminishes the likelihood of false oil alarms.

This design further reduces the operating costs of the system. As the sensing device is operated intermittently, it consumes less power and may require less servicing than in a comparable system in which both the optical sensor and sensing device operate continuously.

Figure 5:
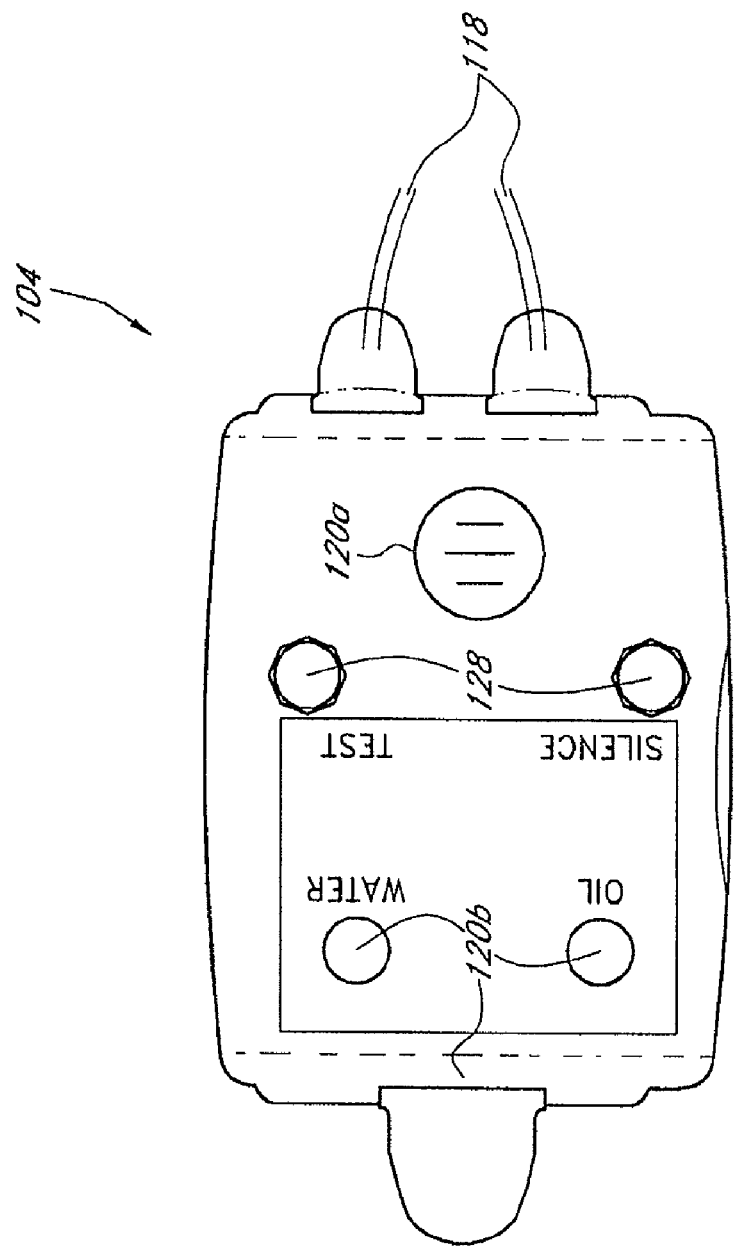
FIG. 5 is a schematic illustration of the alarm indicator of FIG. 1.

A preferred embodiment of the alarm indicator 104 is illustrated in FIG. 5. The alarm indicator 104 comprises a plurality of signal indicators 120a-b. The alarm indicator 104 is interconnected to the power source and the sensor device through the electrical conduit 118. Alarm signals are transmitted from the sensor device to the alarm indicator 104 in response to detection of the presence or absence of oil and water by the optical sensor and sensing device. In turn, the signal indicator 104 issues signals to provide alert. The signals provided by the signal indicators can be audible signals, visible signals, infrared signals, and any combination thereof. In non-limiting examples, the second alarm triggered by the optical sensor may comprise a red beacon light and, in some embodiments, an audible alarm. The first alarm triggered by the sensing device may comprise a yellow beacon light and/or an audible alarm. In certain embodiments, the indicators 120*a* and 120*b* are preferably configured to additionally indicate a "dry" condition, where no liquid is detected by the sensing devices. In an alternative embodiment, the at least one alarm indicator 120*a-b* may further include user operated selector switches 128 which silence, dismiss, and/or test the alarm signals and the indicators 120*a* and 120*b*. In further alternative embodiments, the sensing devices and the at least one alarm indicator 120 may be interconnected inside an alarm panel (not shown) which may serve as a junction box for other electrical connections.

In an additional embodiment, the system may also be configured to send alarms to a remote station for monitoring. Information communicated to the remote station may include, but is not limited, to status conditions such as no liquid present, water detected, and oil detected. In this manner, the alarm system may be deployed at remote locations without the need for a human presence on site to check the alarm status. Advantageously, only when the alarms are triggered would a technician need to be dispatched to the site of the alarm system, reducing the time, labor, and expense associated with monitoring the alarm system.

Figure 6:
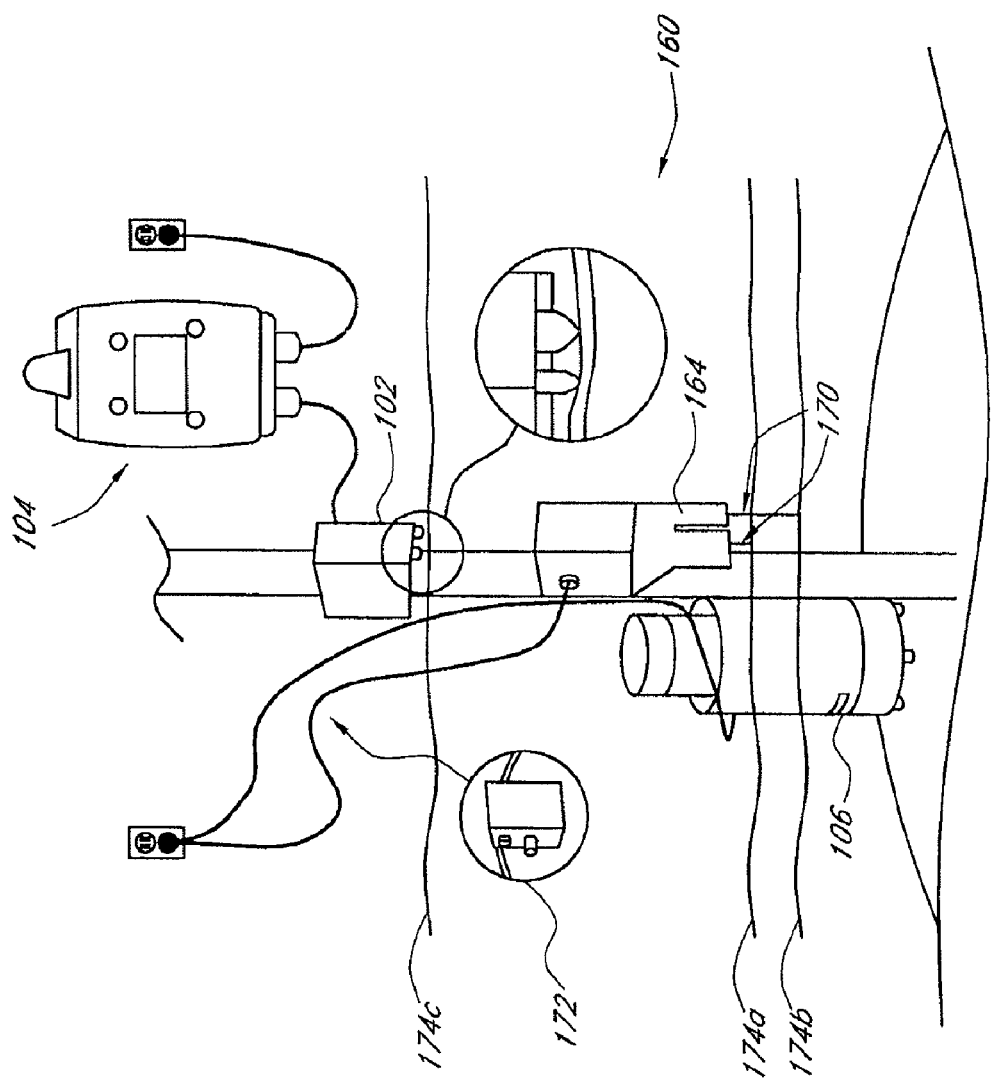
FIG. 6 is a schematic illustration showing the high water alarm system of FIG. 1 used in conjunction with a submersible pump control system.

FIG. 6 illustrates one embodiment of the system 100, operating in conjunction with a submersible pump 166 and a submersible pump controller 164 in an enclosed space 162. The pump controller 164 is operatively interconnected to the pump 166, configured to activate and deactivate the pump 166 based on present conditions, as described below. The pump controller 164 utilizes sensors which may include, but are not limited to, capacitance-based sensors, conductivity probes, dielectric sensors, and/or combinations thereof, to detect the presence or absence of water and oil. In one preferred embodiment, the pump controller 164 utilizes a capacitive-based sensor to detect the presence of oil and water, as described in U.S. Pat. No. 5,856,783. It will be appreciated that the pump controller may be used in connection with a variety of pumps without departing from the scope of the invention.

As shown in FIG. 6, the pump controller 164 in a preferred embodiment possesses a pair of capacitive sensors 170 to detect the presence of water and oil. The pump controller 164, in one embodiment, is electrically connected to the pump 166, interposed by an electronic relay 172. Activation of the pump 166 occurs when both capacitive sensors 170 are submerged, such as approximately at a high water level 174*a*, and the presence of water is detected by the pump controller 164. In this case, the pump controller 164 communicates with the relay 172 to activate an electronic switch, resulting in a flow of electrical power to the pump 166, which turns the pump 166 on. Deactivation of the pump may occur when both capacitive sensors 170 are out of the water, such as approximately at a low water level 174*b* or when oil is detected in the water. In this case, the pump controller 164 communicates with the relay 172 to deactivate the electronic switch and cease the flow of electrical power to the pump 166, turning the pump 166 off. An adjustable deadband is further provided in the pump controller 164, to avoid the pump 166 turning on and off with slight changes in the water level.

As further illustrated in FIG. 6, when the alarm system 100 is utilized in conjunction with the pump control system 160, the alarm system 100 is installed in a location such as above the high water line 174*a* of the pump control system 160. In this manner, should the pump 166 fail to activate when water reaches the high water line 174*a* and the water level reach a critical water level 174*c* at which the sensors 102 and 104 of the alarm system 100 are located, the system will then detect the presence of water and oil and issue the appropriate alarms.

Advantageously, the type of alarms raised by the alarm system of the preferred embodiments may inform monitors of the nature of the problem in the enclosed space. The second alarm, indicating the presence of water, may imply a mechanical malfunction resulting in failure of the pump control system 160 to engage at the high water level 174*a*. Thus, this alarm may inform monitors that repair personnel should be dispatched to the location to fix the pump 166 and/or pump controller 164. The first alarm, indicating the presence of oil, in conjunction with the second alarm would imply that the pump control system 160 is functioning properly, as the pump control system 160 did not activate the pump 166 at the high water level 174*a*, and further inform monitors that oil is present in the enclosed space 162. Thus, this alarm may inform monitors that clean-up personnel should be dispatched to remove oil from the site so as to allow pumping of water from the site. Therefore, the alarm system functions both as a fault redundant system, alerting monitors that the water level has passed the high water level 174*a*, and also as a diagnostic tool, informing monitors of possible causes for why the water level has risen above the high water level 174*a*. In this manner, mechanical problems leading to water accumulation in enclosed spaces may be quickly identified, diagnosed, and remedied, saving time and money.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A water pump system with high liquid alarms, said water pump system comprising:
  a submersible pump configured for installation inside an enclosed space to remove water accumulated inside the enclosed space to outside the enclosed space;
  a pump controller configured to activate the submersible pump when water is detected at a second level inside the enclosed space and to deactivate the submersible pump when water is not detected at a first level inside the enclosed space, wherein the second level is higher than the first level;
  a set of alarm sensors configured for mounting at a third level inside the enclosed space, wherein the set of alarm sensors comprises an optical sensor and a capacitance sensor, the optical sensor is configured to detect liquid at a predetermined level above the second level and to enable flow of electrical power to the capacitance sensor when liquid is detected at the predetermined level, and the capacitance sensor is configured to operate intermittently to detect non-conductive liquid at or above the predetermined level; and
  a plurality of alarm indicators comprising at least a first alarm indicator and a second alarm indicator, wherein the first alarm indicator is triggered by an output of the capacitance sensor and the second alarm indicator is triggered by an output of the optical sensor.

2. The water pump system of claim 1, wherein the enclosed space is a transformer vault, a utility vault, or an elevator shaft.

3. The water pump system of claim 1, wherein the pump controller uses capacitance-based sensors, conductivity probes, dielectric sensors, or combinations thereof to detect water at the first level and the second level.

4. The water pump system of claim 1, wherein the set of alarm sensors are packaged in an encapsulated housing with a portion of the optical sensor and a portion of the capacitance sensor protruding from respective apertures in a common surface of the encapsulated housing.

5. The water pump system of claim 4, wherein the encapsulated housing is liquid-tight, electrically non-conductive, and made of corrosion resistant material.

6. The water pump system of claim 4, wherein the portion of the optical sensor and the portion of the capacitance sensor protruding outside the encapsulated housing terminate at the same distance from the common surface of the encapsulated housing.

7. The water pump system of claim 4, wherein a termination point of the portion of the capacitance sensor protruding outside the encapsulated housing is closer to the common surface of the encapsulated housing than a termination point of the portion of the optical sensor protruding outside the encapsulated housing.

8. The water pump system of claim 4, wherein the portion of the capacitance sensor protruding outside the encapsulated housing terminates at least 1/16" closer to the common surface than the portion of the optical sensor protruding outside the encapsulated housing.

9. The water pump system of claim 4, wherein the set of alarm sensors are interconnected by a single solid-state electrical circuit inside the encapsulated package.

10. The water pump system of claim 1, wherein the plurality of alarm indicators are located outside the enclosed space.

11. A dewatering system with high liquid alarms, said dewatering system comprising:
- means for activating a water pump to remove water from an enclosed space when water is electronically detected at a first level inside the enclosed space;
- means for optically detecting liquid at a second level and enabling means for differentiating between a non-conductive liquid and a conductive liquid at or above the second level when liquid is detected at the second level, wherein the second level is higher than the first level;
- means for generating a first alarm when liquid is optically detected at the second level; and
- means for generating a second alarm when the liquid at or above the second level is non-conductive; and means for a user to silence, dismiss, and test the first alarm and the second alarm.

12. The dewatering system of claim 11, wherein the means for optically detecting liquid and the means for differentiating between a non-conductive liquid and a conductive liquid are positioned to terminate at the same level in the enclosed space.

13. The dewatering system of claim 11, wherein the means for optically detecting liquid are positioned to terminate at a lower level in the enclosed space than the means for differentiating between a non-conductive liquid and a conductive liquid.

* * * * *